US008756107B2

(12) United States Patent
Benco et al.

(10) Patent No.: US 8,756,107 B2
(45) Date of Patent: Jun. 17, 2014

(54) VIRTUAL WORLD SUPPORT FOR ELECTRONIC COMMERCE

(75) Inventors: David S. Benco, Winfield, IL (US); Mark A. Ristich, Naperville, IL (US)

(73) Assignee: Alcatel Lucent, Paris (FR)

( * ) Notice: Subject to any disclaimer, the term of this patent is extended or adjusted under 35 U.S.C. 154(b) by 815 days.

(21) Appl. No.: 12/284,424

(22) Filed: Sep. 22, 2008

(65) Prior Publication Data

US 2010/0076858 A1    Mar. 25, 2010

(51) Int. Cl.
*G06Q 30/00* (2012.01)
*G06F 17/30* (2006.01)

(52) U.S. Cl.
USPC ........................................................ 705/26.1

(58) Field of Classification Search
None
See application file for complete search history.

(56) References Cited

U.S. PATENT DOCUMENTS

| 7,062,722 | B1 * | 6/2006 | Carlin et al. ................. 715/850 |
| 2002/0075311 | A1 * | 6/2002 | Orbanes et al. ............... 345/764 |
| 2002/0107762 | A1 * | 8/2002 | Kunigita ........................ 705/27 |
| 2003/0128205 | A1 * | 7/2003 | Varghese ...................... 345/419 |
| 2005/0137015 | A1 * | 6/2005 | Rogers et al. .................. 463/42 |
| 2008/0275769 | A1 * | 11/2008 | Shao .............................. 705/14 |
| 2009/0222424 | A1 * | 9/2009 | Van ................................. 707/3 |

FOREIGN PATENT DOCUMENTS

WO     WO 02075530 A1 *  9/2002

OTHER PUBLICATIONS

Avatar, The Influence of Avatars on Online Consumer Shopping Behavior, Holzwarth, Martin, Journal of Marketing, vol. 70 (Oct. 2006), pp. 19-26 downloaded from http://www.atypon-link.com/AMA/doi/pdf/10.1509/mkg.70.4.19?cookieSet=1 on Sep. 9, 2010. (NPL_Avatar.pdf).*

* cited by examiner

*Primary Examiner* — Paul Danneman
(74) *Attorney, Agent, or Firm* — Carmen Patti Law Group, LLC

(57) ABSTRACT

An apparatus in one example has: virtual world having at least one object; vendor template database having at least one product template; vendor template server operatively coupled to the vendor template database and to the virtual world; and at least one profile that contains at least one descriptive characteristic of one of an avatar and an object, the at least one profile stored in at least one of the virtual world and the vendor template database.

21 Claims, 5 Drawing Sheets

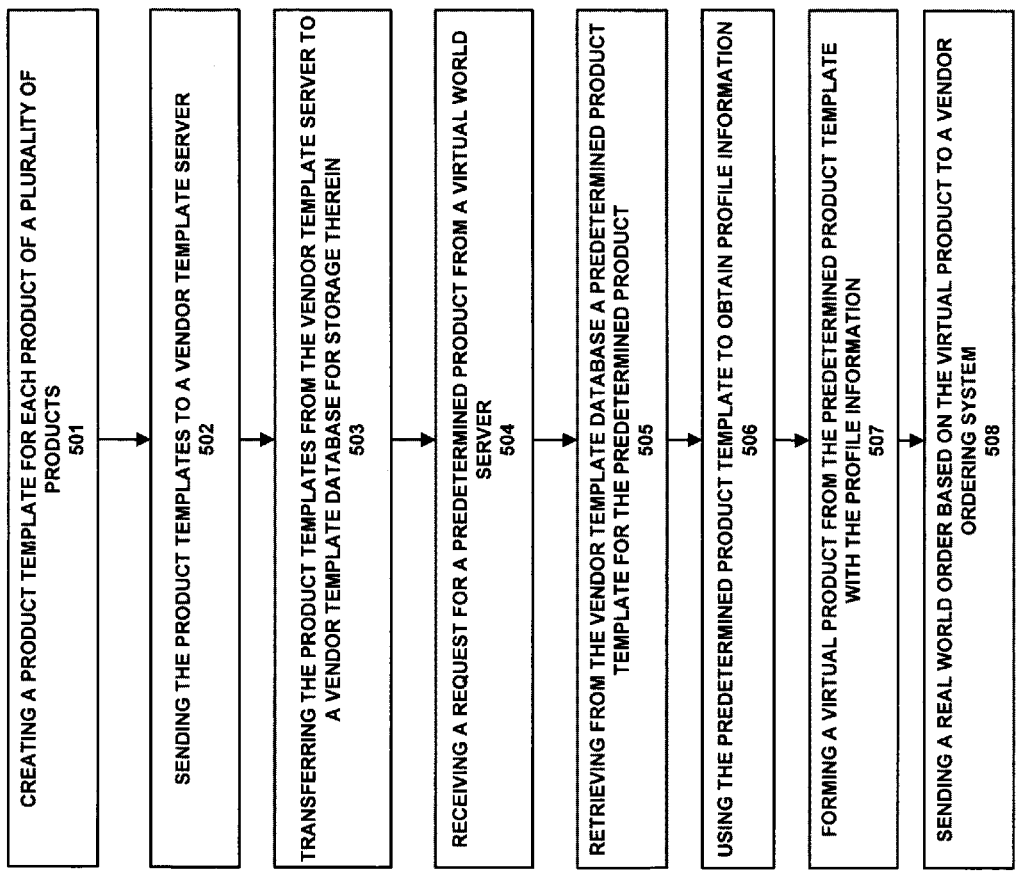

VIRTUAL WORLD SUPPORT FOR ELECTRONIC COMMERCE

TECHNICAL FIELD

The invention relates generally to e-commerce, and in particular to the use of virtual worlds (such as Second Life, etc.) to personalize the e-commerce purchasing process.

BACKGROUND

Internet marketing, also referred to as online marketing, Internet advertising, or eMarketing, is the marketing of products or services over the Internet. The Internet has brought many unique benefits to marketing, one of which being lower costs for the distribution of information and media to a global audience. The interactive nature of Internet marketing, both in terms of providing instant response and eliciting responses, is a unique quality of the medium. Internet marketing is sometimes considered to have a broader scope because it refers to digital media such as the Internet, e-mail, and wireless media; however, Internet marketing also includes management of digital customer data and electronic customer relationship management systems.

However, from the buyer's perspective, the inability of shoppers to touch, smell, taste or "try on" tangible goods before making an online purchase can be limiting. In an attempt for e-commerce vendors to reassure customers, the e-commerce vendors have implemented liberal return policies as well as providing in-store pick-up services.

The current art for electronic commerce utilizes static (and sometimes multiple) images to display products for sale. For certain well-understood products, such as books, this is sufficient. However, for products such as clothing, jewelry, home furnishings, etc. static images are inadequate. For example, it would be useful to see how clothing would appear on an image of one's self, to see how furnishings would look in one's home, etc. Currently e-commerce sites do not personalize the buying experience for these types of personal items. Even if a buyer knows the correct clothing size or room dimensions, seeing the clothing or furnishings outside of a familiar context does not complete the picture of how one would appear in the clothing or how the furnishings would synchronize with the decor of the home.

Thus, customers are not able to "experience" certain merchandise prior to purchasing on e-commerce web sites.

SUMMARY

One embodiment according to the present method and apparatus is an apparatus that may comprise: virtual world having at least one object; vendor template database having at least one product template; vendor template server operatively coupled to the vendor template database and to the virtual world; and at least one profile that contains at least one descriptive characteristic of one of an avatar and an object, the at least one profile stored in at least one of the virtual world and the vendor template database.

Another embodiment according to the present method and apparatus is a method that may comprise the steps of: creating a product template for each product of a plurality of products; sending the product templates to a vendor template server; transferring the product templates from the vendor template server to a vendor template database for storage therein; receiving a request for a predetermined product from a virtual world server; retrieving from the vendor template database a predetermined product template for the predetermined product; using the predetermined product template to obtain profile information; forming a virtual product from the predetermined product template with the profile information; and sending a real world order based on the virtual product to the vendor ordering system.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 5 depicts a flow diagram of a method according to the present method and apparatus.

DETAILED DESCRIPTION

Figure 1:
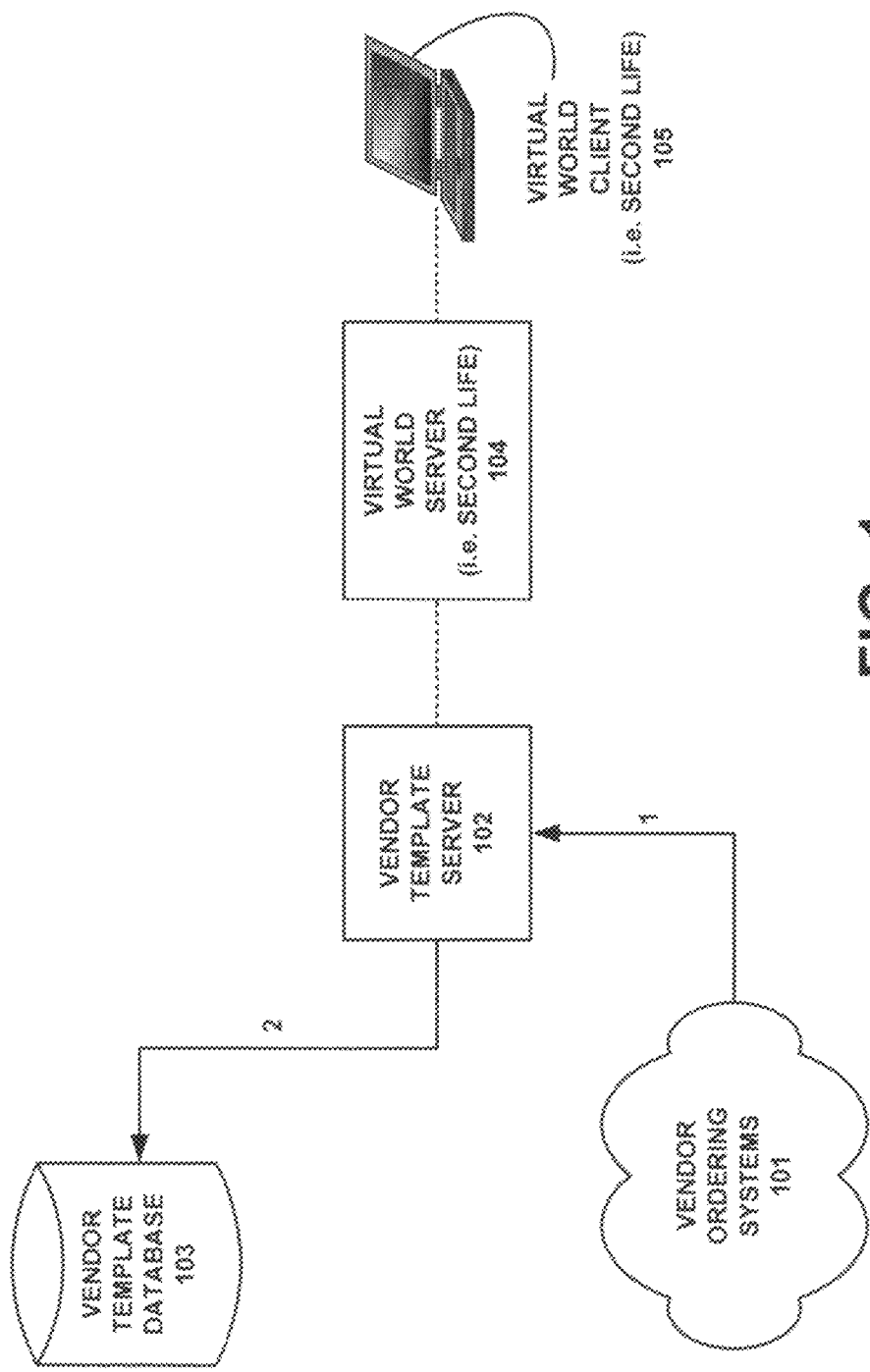
FIG. 1 depicts an embodiment according to the present method and apparatus for providing virtual products in a virtual world.

A feature of the embodiments according to the present method and apparatus is the utilization of the real-world nature of virtual worlds (such as Second Life, etc.) to personalize the e-commerce purchasing process. In particular, recent advances in technology have enabled realistic avatars (controllable representation of human forms) and navigation of buildings (with realistic room dimensions, furnishings, etc.). According to the present method and apparatus the technology may be enhanced to support, for example, outfitting of a user's avatar with a new wardrobe, viewing the fit from multiple perspectives (in the mirror, from behind, etc.), matching the best color to the user's skin tone, etc. Similar personalization may be accomplished, for example, by placing new furniture or accessories into a realistic model of the user's home, verifying that the style is compatible with existing decor, varying the placement, etc.

For example, consider ordering real world clothing from a virtual world. A user may use the user's Second Life avatar to try on clothes, verify that a certain style suits the user's body type, determining that the color is compatible with the user's skin tone, etc. The user may then order products with a high level of confidence that the user will be satisfied with the purchased products.

Another example is ordering furniture and other home decorations, including color schemes, paints, pictures etc. According to the present method and apparatus a representation of the user's house may be configured with the items that the user is considering for purchase. In the virtual house the items may be moved around to determine if they will be correct for the user's real world house. Once the user is satisfied with the items they may be ordered and delivered to the user's house in the real world.

In order to implement the present method and apparatus a certain amount of accurate detailed information about the user and the user's environment must be supplied. This information, such as size (height, weight, measurements, etc.) or other attributes (room dimensions, color scheme, etc.), may be stored in a vendor template database for each available product. The information may then be obtained from the virtual world user's profile (e.g., height, weight, etc.) or may be supplied via tools on the site (e.g., tools to build a replica of the user's living room in the virtual world).

In essence, depending on the item being marketed, there will be a "template" required to determine correct ordering rules. For example, if it is a suit, then the user's height, weight, inseam measurements, waist measurement, etc. will be required, but the user's shoe size or ring size is not, nor are any items related to room dimensions, etc. In this way, each vendor offering a good or service will supply the "template" required to enable them to fill the order correctly. At that point the "template server" will be able to request that these details be supplied by the user (for example, his avatar may be created to look like him based on these sorts for templates in general, and in that way, the clothes will look as it would if he really wore them).

According to one embodiment of the present method, a vendor sends "template" data for merchandise (for example, once per product offered) to the vendor template server. The vendor template server then sends required information to the virtual world server for inclusion in the virtual world "market". A virtual world user may interact with products, such as clothing, furniture, etc., in the virtual world "market".

The virtual world server bridges communication between an object and the associated vendor template server/database. The object may be, for example, an article of clothing, a table, etc. Typically, the object is programmed to have a degree of intelligence. The object may collect the necessary data from the user profile (sizes, dimensions, etc.) and prompts the user for any additional information (e.g., color) in order to customize the user interaction. If the merchandise is ordered, the order is sent from the virtual world server to the vendor template server which forwards the order to the vendor with the details required to complete, charge for, and deliver the order.

The profile may contain a plurality of data items that describe an associated avatar, for example, physical measurements for use in purchasing clothing. The profile may also contain a plurality of data items that describe elements linked to an avatar, for example, an element may be a description of a table or a sofa.

A number of virtual worlds exist on the Internet. Second Life is one of the best-known virtual worlds. Second Life is a very flexible online environment. It is a place where you can create almost anything you can imagine and share it with a vibrant community. You relate to this world through an avatar, which is highly customizable, and there are tools for building 3D objects integrated into the software. Basic access is free, but premium accounts can be purchased by those who want to get more involved. People gather to share similar interests, have business meetings, advertise their wares, and flirt, among other things. Second Life has robust chat features and an enormous selection of emotes you can use to express yourself. Many people make avatars that resemble their actual appearance.

Second Life gives people a great deal of freedom to create content, so it's not unusual to find major corporations with some sort of presence in world. User-generated content comprises a large portion of the activity within Second Life. Second Life may be considered part of the web 2.0 phenomenon in that the residents create most of the content of the world. Built into the client is a 3D modeling tool that allows any resident to build virtual objects. Residents can also create gestures and animations using software such as Poser. Second Life also includes a scripting language called Linden Scripting Language, or LSL, which can be used to add autonomous behavior to objects and create dynamic systems. User generated content can run the gamut from simple furniture and apparel to complex systems such as the artificial life experiment of Svarga, where a complete ecology runs autonomously.

Second Life allows users to give, or sell, objects that have been created to other residents. The Second Life Terms of Service ensure that users retain copyright to any content they create. Within the server and client is a permissions and digital rights management system which prevents residents from casually disregarding a creator's copyright. The creator of an in-world object decide whether or not any recipient of them can modify, copy, or transfer the creation.

The basis of this economy is that residents can buy and sell services and virtual goods to one another in a free market. Services include camping, working in stores, business management, entertainment, custom content creation, and other personal services. Virtual goods include buildings, vehicles, devices of all kinds, animations, clothing, skin, hair, jewelry, flora and fauna, and works of art. To make money in Second Life, one must find customers who are willing to pay for the services or products that one can supply, just like in real life.

In one embodiment according to the present method and apparatus a first step is the creation of an avatar that substantially resembles a user. That is, the avatar has substantially the same dimensions and characteristics in the virtual world as the user has in the real world. This may include for example height, weight, skin color, hair color, etc. To create the avatar the user may download a set of data that describes the user, or the user may download a picture of the user to a database. Then software in the virtual world may be used to make the avatar look just like user.

A vendor prepares at least one product template, which is a template to be filled in by the user with regards to data items necessary to create a product in the virtual world, which matches the specific parameters defined by the user. That is, for example a virtual coat would need data that describes the size of the body of the avatar (user), and the style and color desired by the user. This necessary product data may be a subset of a total data set for a user. The virtual coat may now be provided to the user, and the user may now see how he would look in the real world by observing his avatar in the virtual world.

FIG. 1 depicts an embodiment according to the present method and apparatus for providing virtual products in a virtual world. In general a vendor creates a template for each of his products, and sends the templates to the vendor template server 102. The vendor template server 102 stores the templates in the vendor template database 103. The vendor may also have a vendor ordering system 101 that interfaces with the vendor template server 102. The vendor ordering system 101 may effect the above-described preparation of a virtual product, and the ordering of the real product in the real world. The vendor template server 102 may be operatively coupled to a virtual server 104 that is operatively coupled to a virtual world client 105.

Figure 2:
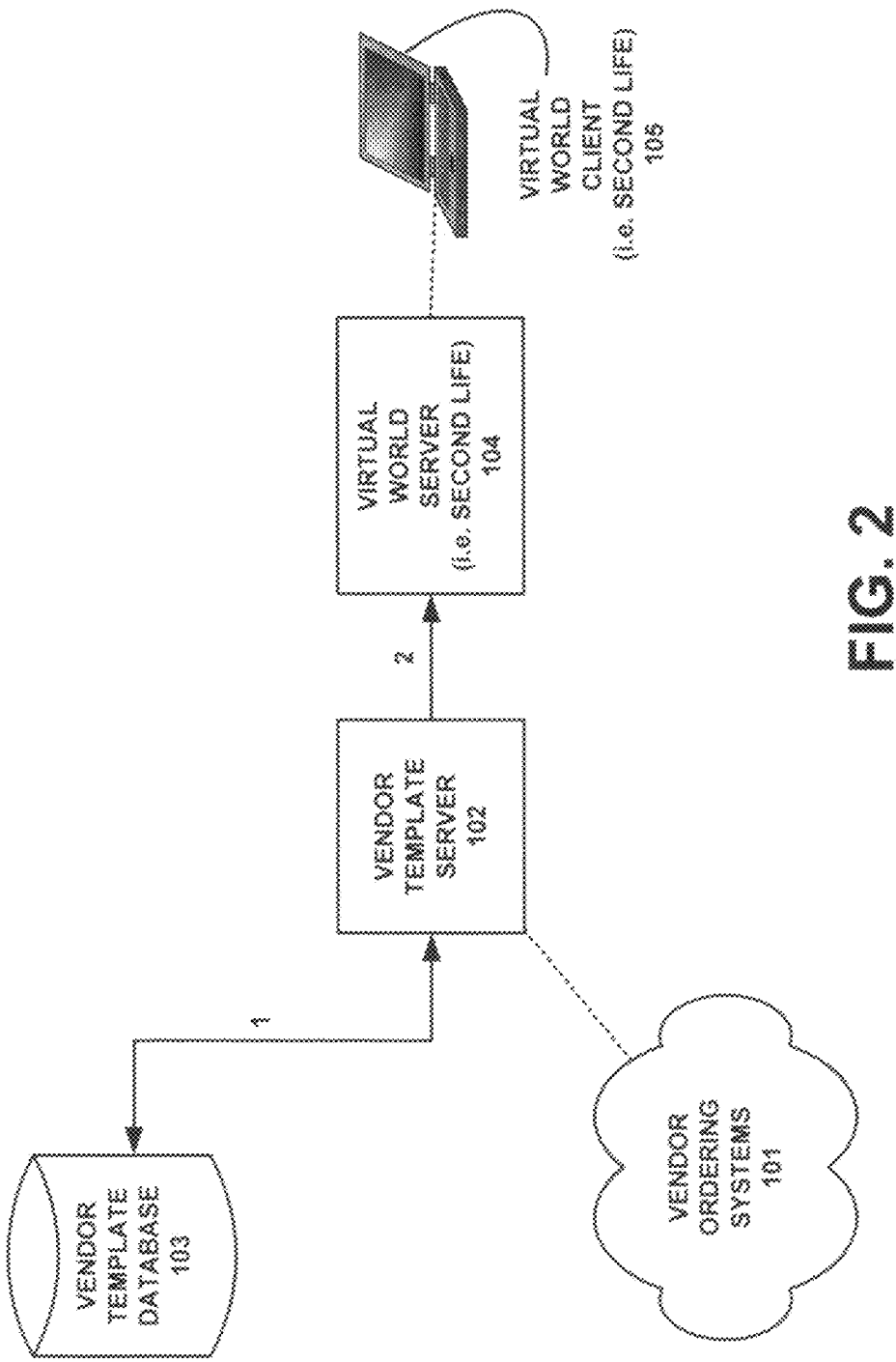
FIG. 2 depicts that the vendor template server has retrieved a product template from the vendor template database.

FIG. 2 depicts that the vendor template server 102 has retrieved a product template from the vendor template database 103, and has supplied a virtual product to the virtual world server 104.

Figure 3:
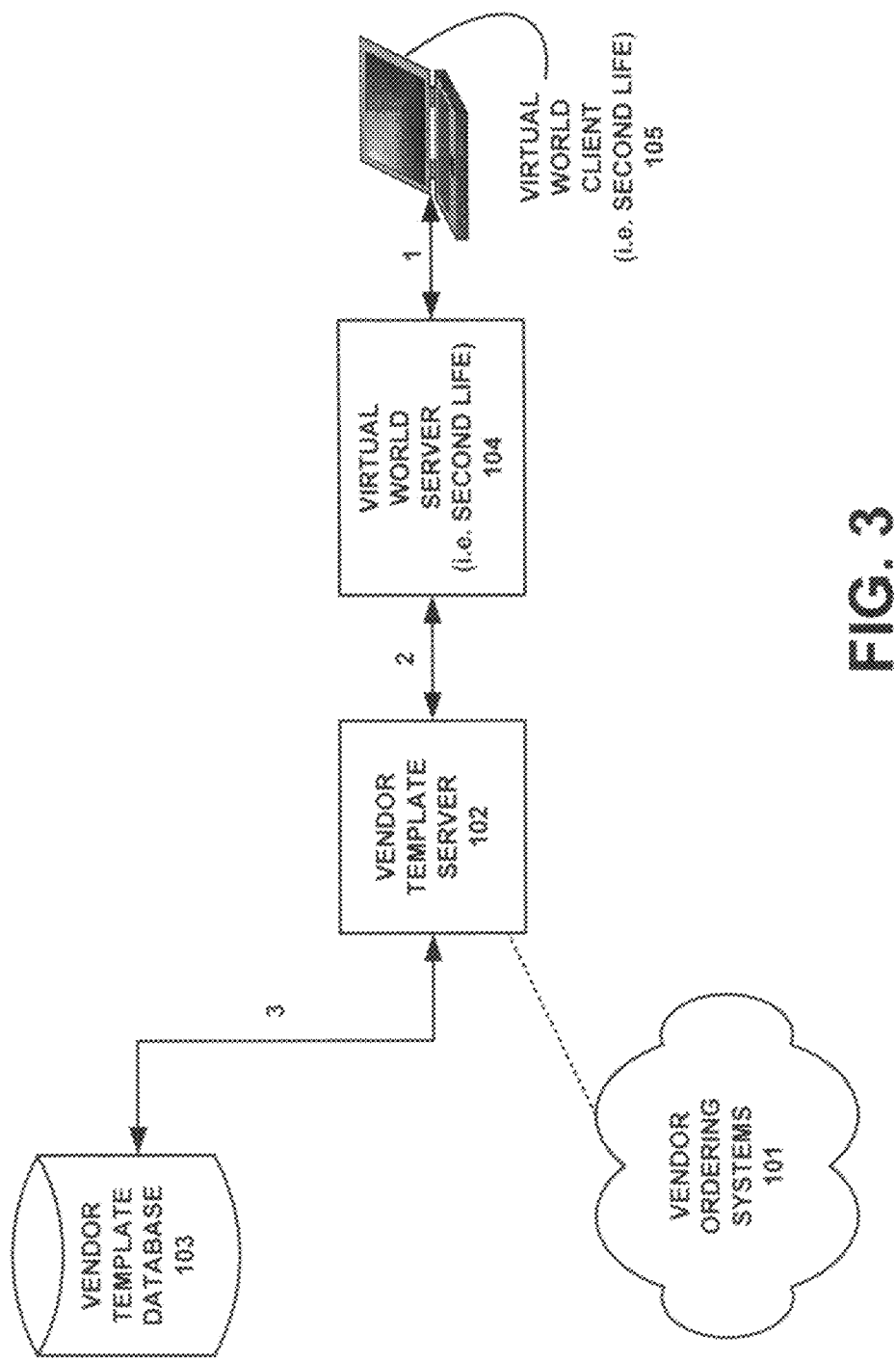
FIG. 3 depicts that the avatar (virtual world user) interacts with objects.

FIG. 3 depicts that the avatar (virtual world user) interacts with objects. There is communication between the vendor template server 102 and the virtual world server 104 in order to ensure that all details required by this object for this user are supplied, based on the requirements specified in the vendor template database 103.

Figure 4:
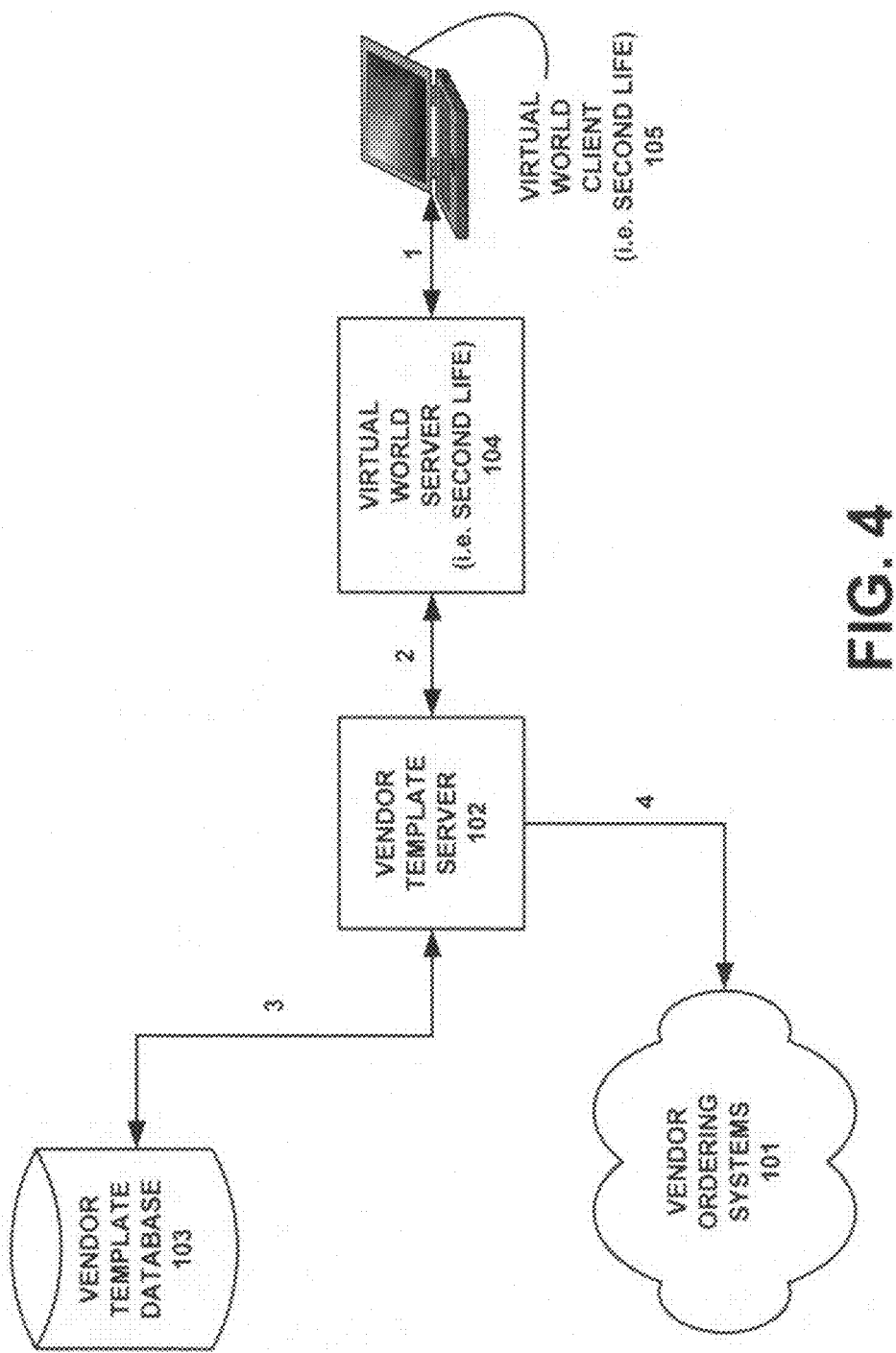
FIG. 4 depicts that the virtual world user 105 selects an item for order.

FIG. 4 depicts that the virtual world user 105 selects an item for order. The order is sent from the virtual world server 104 to the virtual template server 104, which forwards the order to the vendor ordering systems 101 with the details required to complete, charge for, and delivery of the order.

As a further example, a sofa takes on the size, color, etc. according to a template. The sofa may then be placed in a room (that corresponds to a room in the real world) and the user may see how a real sofa would look in the real room.

Information regarding the user in terms of the avatar may be stored in a user profile. When an avatar (person in the virtual world) wants to see a product, the vendor template server may fill in the respective product template from a stored profile for the user, or may use the product template to request the user (avatar) to supply the data. The template may actually be the driver for filling in the profile. As the user purchases more items, the profile is filled in with more and more information.

As described above the user may or may not keep the profile for the user. The virtual template server may be responsible for storing the user profile. Alternatively, the user may be responsible for keeping his profile in the virtual world and presenting it to the vendor when the user desires to purchase a product. The user may present the entire profile to the vendor or the user may forward to the vendor only those data items required for the respective template.

FIG. 5 depicts a flow diagram of a method according to the present method and apparatus. In this embodiment the method may comprise: creating a product template for each product of a plurality of products (step 501); sending the product templates to a vendor template server (step 502); transferring the product templates from the vendor template server to a vendor template database for storage therein (step 503); receiving a request for a predetermined product from a virtual world server (step 504); retrieving from the vendor template database a predetermined product template for the predetermined product (step 505); using the predetermined product template to obtain profile information (step 506); forming a virtual product from the predetermined product template with the profile information (step 507); and sending a real world order based on the virtual product to a vendor ordering system (step 508).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium for the apparatus in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following.

What is claimed is:

1. An apparatus for use with a computer-based virtual world, said computer-based virtual world comprising realistic representation of people, buildings and environments as they exist in the real world, comprising:
vendor ordering system for preparing templates representing characteristics of a product, said product comprising one or more items for use in a building or environment;
vendor template server, operatively coupled to the vendor ordering system, for receiving product templates and for supplying objects based on the product templates;
vendor template database, operatively coupled to the vendor template server, for storing product templates; and
virtual world server for receiving objects from the vendor template server, making them available in a virtual marketplace in the computer-based virtual world and facilitating interaction between a user in the computer-based virtual world and an object selected by the user by allowing the user to display the object as it would appear in a building or environment associated with the user in the real world as appropriate for the selected object;
wherein, when the user interacts with the selected object in the marketplace, the virtual world server uses the product templates and information about the user stored in a user profile to customize the display of the product for the user,
wherein, if the user decides to purchase the object, details required to complete the purchase are sent from the virtual world server to the vendor template server, which sends them to the vendor ordering system.

2. The apparatus according to claim 1, wherein the object is an intelligent object that utilizes the at least one product template in the vendor template database via the vendor template server.

3. The apparatus according to claim 1, wherein the user in the computer-based virtual world has at least one avatar and wherein the user profile contains at least one descriptive characteristic of the avatar.

4. The apparatus according to claim 1, wherein the user profile contains at least one descriptive characteristic of one of an avatar and an object, and wherein the at least one profile is stored in at least one of the computer-based virtual world or the vendor template database.

5. The apparatus according to claim 4, wherein the user profile contains a plurality of items that describe an associated avatar and the avatar has substantially the same dimensions and characteristics in the virtual world as the user has in the real world.

6. The apparatus according to claim 4, wherein the user profile contains a plurality of descriptive characteristics that describe objects linked to an avatar.

7. The apparatus according to claim 1, wherein the vendor ordering system effects preparation of a virtual product, and ordering of a corresponding real product in the real world.

8. The apparatus of claim 1 wherein the one or more products further comprise items for a person to wear or use, and an object based on the product template is displayed as it would appear when worn by the user.

9. A apparatus for use with a computer-based virtual world, said computer-based virtual world comprising realistic representation of people, buildings and environments as they exist in the real world, comprising;
  at least one object representing a product for sale by a vendor in the computer-based virtual world, said product comprising one or more items for use in a building or environment;
  vendor template database having at least one product template corresponding to said at least one object;
  vendor template server operatively coupled to the vendor template database and to the computer-based virtual world;
  virtual world server for displaying objects in a virtual marketplace in the computer-based virtual world and facilitating interaction between a user in the computer-based virtual world and an object selected by the user; and
  at least one profile that contains at least one descriptive characteristic of a user in said computer-based virtual world, the at least one profile stored in at least one of the computer-based virtual world or the vendor template database;
  wherein the object is displayed in the computer-based virtual world by adding descriptive characteristics from the profile to the product template and allowing the user to display the object as it would appear in a building or environment associated with the user in the real world as appropriate for the selected object;
  wherein, if the user decides to purchase the object, details required to complete the purchase are sent from the computer-based virtual world to the vendor of the object.

10. The apparatus according to claim 9, wherein the object is an intelligent object that utilizes the at least one product template in the vendor template database via the vendor template server.

11. The apparatus according to claim 9, wherein the computer-based virtual world has a virtual world server that bridges communication between user and the vendor template server.

12. The apparatus according to claim 9, wherein the user in the computer-based virtual world has at least one avatar, and wherein the at least one profile contains at least one descriptive characteristic of the avatar.

13. The apparatus according to claim 9, wherein the apparatus further comprises a vendor ordering system that interfaces with the vendor template server, and wherein the details required to complete the purchase are sent from the computer-based virtual world to the vendor ordering system which effects preparation of said object for sale, and ordering of a corresponding real product in the real world.

14. The apparatus of claim 9 wherein the one or more products further comprise items for a person to wear or use, and an object based on the product template is displayed as it would appear when worn by the user.

15. A method for use with a computer-based virtual world hosted on a virtual world server, said computer-based virtual world comprising realistic representation of people, buildings and environments as they exist in the real world, comprising:
  using a computer-based vendor ordering system to create a product template for each product of a plurality of products, said plurality of products comprising one or more items for use in a building or environment;
  sending the product templates to a computer-based vendor template server;
  transferring the product templates from the computer-based vendor template server to a vendor template database for storage therein;
  sending virtual product information, based on the product templates, to the virtual world server to be displayed in the computer-based virtual world;
  receiving a request, by the computer-based vendor template server, for a predetermined virtual product from the virtual world server when a user of said computer-based virtual world selects the product;
  retrieving from the vendor template database a predetermined product template for the predetermined virtual product;
  using the predetermined product template to obtain information from a profile associated with the user;
  modifying a display of the virtual product by using the predetermined product template as modified by the profile information so that the virtual product is displayed as it would appear in a building or environment associated with the user in the real world as appropriate for the virtual product and facilitating interaction between the user and the virtual product; and
  sending a real world order to the computer-based virtual ordering system based on the virtual product selected by the user.

16. The method according to claim 15, wherein the virtual product is an intelligent virtual product that utilizes the at least one product template in the vendor template database via the computer-based vendor template server.

17. The method according to claim 15, wherein the method further comprises ordering a real world product based on the virtual product that corresponds to the real world product.

18. The method according to claim 15, wherein the computer-based vendor ordering system effects preparation of the virtual product, and ordering of a real world product corresponding to the virtual product.

19. The method according to claim 15, wherein the profile associated with the user contains at least one descriptive characteristic of an avatar, and wherein the profile is stored in at least one of the virtual world or the vendor template database.

20. The method according to claim 15, wherein when a request selecting a virtual product is received from a user having an avatar, the vendor template server fills in a respective product template from at least one of a stored profile related to the avatar and data received from the avatar in response to a request by the computer-based vendor template server to supply the data, and wherein data from the at least one of the profile and supplied data is used to construct a virtual product representative of a real world product.

21. The method of claim 15 wherein the one or more products further comprise items for a person to wear or use, and an object based on the product template is displayed as it would appear when worn by the user.

* * * * *